US006254137B1

(12) United States Patent
Baum, Jr. et al.

(10) Patent No.: US 6,254,137 B1
(45) Date of Patent: Jul. 3, 2001

(54) RESEALABLE MULTIPLE-LAYER LABEL

(75) Inventors: Robert E. Baum, Jr., Dell Rapids; Terry Michael Jonas, Renner, both of SD (US)

(73) Assignee: CCL Label, Inc., Monrovia, CA (US)

( * ) Notice: Subject to any disclaimer, the term of this patent is extended or adjusted under 35 U.S.C. 154(b) by 0 days.

(21) Appl. No.: 09/360,273

(22) Filed: Jul. 26, 1999

(51) Int. Cl.[7] ................................ C09J 7/02; G09F 3/02; B32B 7/06

(52) U.S. Cl. ................................ 283/81; 428/40; 428/41; 428/42

(58) Field of Search ................................ 283/81; 428/40, 428/41, 42

(56) References Cited

U.S. PATENT DOCUMENTS 4,726,972 2/1988 Instance .
4,744,161 5/1988 Instance .
4,747,618 5/1988 Instance .
4,773,584 9/1988 Instance .
4,991,878 2/1991 Cowan et al. .
5,127,676 7/1992 Bockairo .
5,290,616 3/1994 Cowan et al. .
5,588,239 12/1996 Anderson .
5,766,716 * 6/1998 Barry .................................... 283/81

* cited by examiner

*Primary Examiner*—Willmon Fridie, Jr.
*Assistant Examiner*—Mark T. Henderson
(74) *Attorney, Agent, or Firm*—Warner Norcross & Judd LLP

(57) ABSTRACT

A multiple-layer label having a base sheet and a resealable top sheet in laminated arrangement to define a peripheral margin and an interior area. The top sheet is adhesively hinged to the base sheet in a first area of the peripheral margin and releasably adhered to the base sheet in substantially the remainder of the peripheral margin. A first informational sheet is adhered to the rear interior area of the top sheet. A second informational sheet is adhesively hinged to a portion of the front interior area of the base sheet. The label thus provides multiple sheet surfaces for informational text. The sheets of the label turn like the pages of a book, yet can be enclosed and substantially sealed by the top sheet to protect the informational sheets from environmental damage. The label may be permanently adhered to the product so that the user will not lose or separate the informational text from the product.

12 Claims, 3 Drawing Sheets

RESEALABLE MULTIPLE-LAYER LABEL

BACKGROUND OF THE INVENTION

The present invention relates to labels, and more particularly to multiple-layer labels providing multiple print surfaces.

It is often necessary for manufacturers to provide a large amount of textual information—such as safety information, warnings, warranties, and use instructions—with products such as herbicides, pesticides, and cleaners. If the product container is large—as is typical when a product is sold for industrial use—then the manufacturer can simply apply to the product container a label large enough to include all the required informational text. However, numerous products are provided in relatively small containers for consumer use. In such case, the manufacturer cannot provide all of the informational text on a single print-surface label without shrinking the text font to an undesirably small size. Further, although the manufacturer can provide the textual information in printed material such as a booklet or folded sheet that is separate from the product packaging, the booklet or folded sheet can be easily lost or separated from the container. The consumer will then lack easy access to the safety and use information when using the product.

There have been several approaches to providing labels that have multiple print surfaces and that can be affixed to relatively small containers. U.S. Pat. No. 4,747,618 issued May 31, 1988 to Instance entitled "Labels and Manufacture Thereof" is exemplary of an "extended text" label. A longitudinal strip 4 is adhered to a top plastic sheet 28, which in turn, is adhesively hinged to a base sheet 26. (FIG. 3.) The longitudinal strip is folded to form several print surface panels 6, 8, 10, 12. A cut 32 in the top sheet forms the free outer edge 20, which a user lifts to open the label and extend the folded strip in order to read it. Several holes 22 in a portion of the longitudinal strip allow the adhesive on the rear surface of the top plastic sheet 28 to adhere to the base sheet 26 when the label is re-folded and closed. (FIG. 2.) However, the longitudinal strip when extended can be unwieldy and prone to tearing. Further, the exposed edges of the Instance extended text construction can wick water to ruin the enclosed print material.

U.S. Pat. No. 4,991,878 issued Feb. 12, 1991 to Cowan entitled "Label Assembly with Removable Booklet" discloses a label assembly 10 incorporating a removable booklet 14. The booklet 14 is sandwiched within pocket 47 formed between over-laminate 16 and base sheet 12. When closed, over-laminate 16 is sealed around substantially the entire periphery of base label 12 to protect the booklet 14 before removal. Although Cowan provides a means for including a large amount of informational text with a product, the informational booklet can be lost or separated from the product container as soon as the label is opened and the booklet is removed.

SUMMARY OF THE INVENTION

The aforementioned problems are overcome in the present invention wherein a multiple-layer label is provided with a resealable top sheet. More specifically, the label includes a base sheet and a top sheet in laminated arrangement to define a peripheral margin and an interior area. The top sheet is adhesively hinged to the base sheet in a first area of the peripheral margin and releasably adhered to the base sheet in substantially the remainder of the peripheral margin. A first informational sheet is adhered to the rear interior area of the top sheet. A second informational sheet is adhesively hinged to a portion of the front interior area of the base sheet. In operation, the sheets of the label turn like the pages of a book, yet can be enclosed and substantially sealed by the top sheet.

The multiple-layer label of the present invention provides several advantages. The label provides multiple sheet surfaces for informational text without requiring the reader to unfold and fold an unwieldly extended text sheet. The hinged construction of the multiple sheets provides the same page-turning convenience as a booklet. The inventive label may be permanently attached to a container or product so that the user will not lose or separate the informational text from the product. Further, the label provides a resealable top sheet to protect the label from water and other environmental damage. The sheets of the label can be made of waterproof materials to impart further protection from deterioration.

These and other objects, advantages, and features of the invention will be more readily understood and appreciated by reference to the detailed description of the preferred embodiment and the drawings.

DETAILED DESCRIPTION OF THE PREFERRED EMBODIMENT

Figure 1:
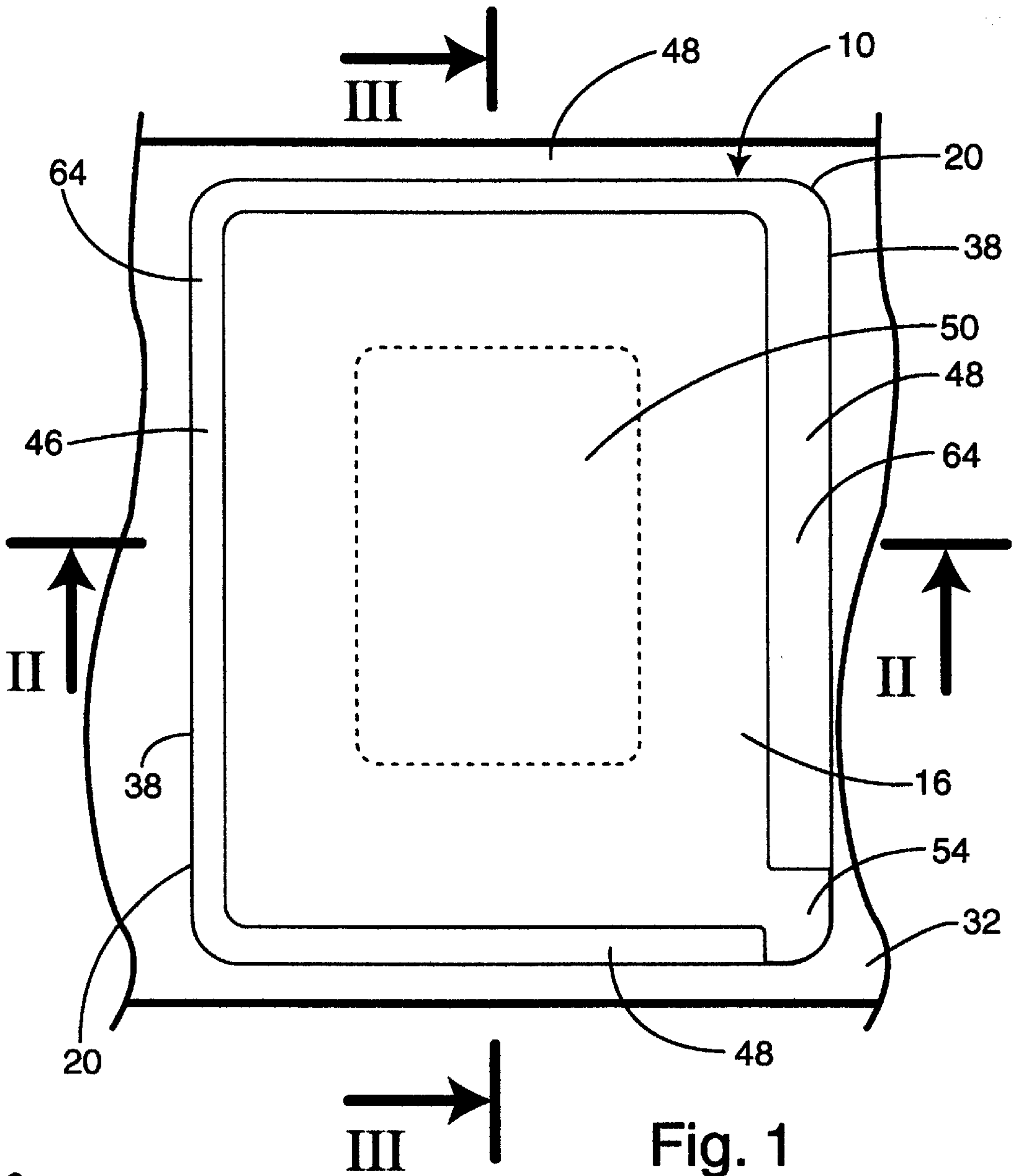
FIG. 1 is plan view of the multiple-layer label of the present invention.

The multiple-layer label 10 of the present invention (FIGS. 1–4) includes a base sheet 12 and a top sheet 14 in a laminated arrangement, and first and second informational sheets 16 and 18 located between the base and top sheets.

Base sheet 12 defines a perimeter edge 20 and a front side 22. The front side 22 includes a front peripheral margin 24 adjacent to the perimeter edge 20. The front peripheral margin 24 extends around front interior area 26. Information 27 (depicted by a broken line in FIG. 4) may be printed within the front interior area 26 of the front surface 22 of base sheet 12. Base sheet 12 may be made of any material suitable for labeling applications, such as paper or plastic. Preferably, base sheet 12 is constructed of a water-resistant material, such as plastic or coated paper, more preferably a water-proof material such as plastic.

Top sheet 14 defines a perimeter edge 38 and a rear side 40. The rear side includes a rear peripheral margin 42 adjacent to the perimeter edge 38. The rear peripheral margin 42 extends around rear interior area 43. A top sheet adhesive layer 44 is applied to the rear surface 40 of the top sheet 14. Adhesive 44 hinges top sheet 14 to base sheet 12 in a first zone 46, which in the embodiment shown in the drawings, extends on the left side of label 10 within the peripheral margin 42 of the top sheet. Adhesive 44 also releasably adheres top sheet 14 in a second zone 48, which includes the substantial portion of peripheral margin 42 not occupied by first zone 46. The releasable characteristic in second zone 48 may be achieved: i) by using an adhesive with less adherence that the adhesive of first zone 46 or ii)

by using the same adhesive in both zones—but either chemically or otherwise dampening the adhesive in second zone 48 or applying a release agent to the areas of base sheet 12 corresponding to the second zone 48. Preferably, top sheet 14 is made of a water-resistant material, or more preferably a water-proof material such as plastic. Also preferably, the top sheet is transparent.

First informational sheet 16 is adhered to the rear side 40 of top sheet 14, preferably substantially within the interior area 43, by adhesive layer 44. Also preferably, the entire front side of first sheet 16 is adhered to the top sheet 14. If top sheet 14 is transparent, then the top surface of first sheet 16 is visible through the top sheet so that information 50 (depicted by a broken line in FIG. 1) printed on the front side of first sheet 16 can be read. First sheet 16 may also include information 52 (depicted by a broken line in FIG. 4) printed on the rear surface of first sheet 16.

Figure 2:
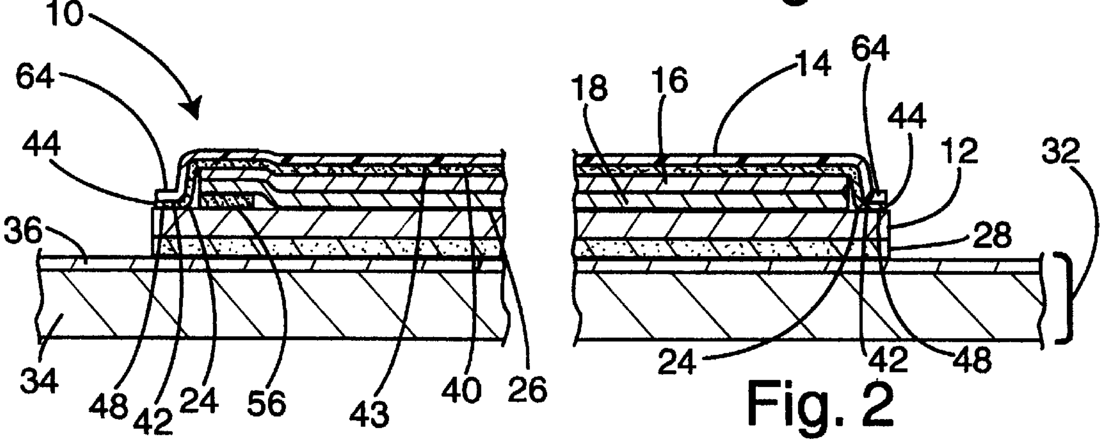
FIG. 2 is a fragmentary sectional view taken along the line II—II of FIG. 1.
Figure 3:
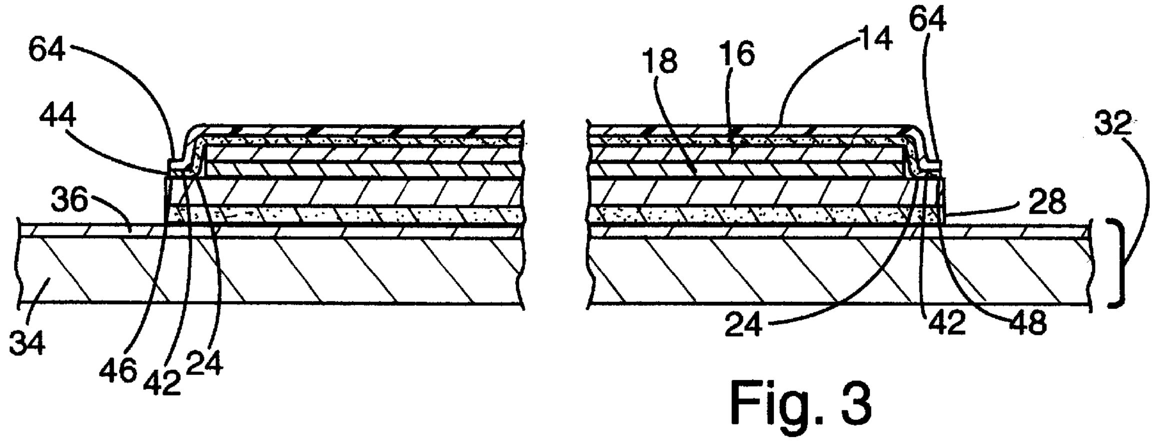
FIG. 3 is a fragmentary sectional view taken along the line III—III of FIG. 1.

Second informational sheet 18 is adhesively hinged within and to the front interior area 26 of base sheet 12 by hinge adhesive 56. (FIG. 2.) Preferably second sheet 18 is substantially within the front interior area 26 of base sheet 12. Second sheet 18 can include information 58 and 60 (depicted by a broken line in FIG. 4) printed on its front and rear surfaces, respectively. First and second informational sheets 16 and 18 can be made of any suitable material, preferably a water-resistance material such as coated paper or plastic, more preferably a water-proof material such as plastic. It is anticipated that additional informational sheets (not shown) can be adhesively hinged to either the rear side of first informational sheet 16 or the front side of second informational sheet 18 to provide additional pages for printed information.

Figure 4:
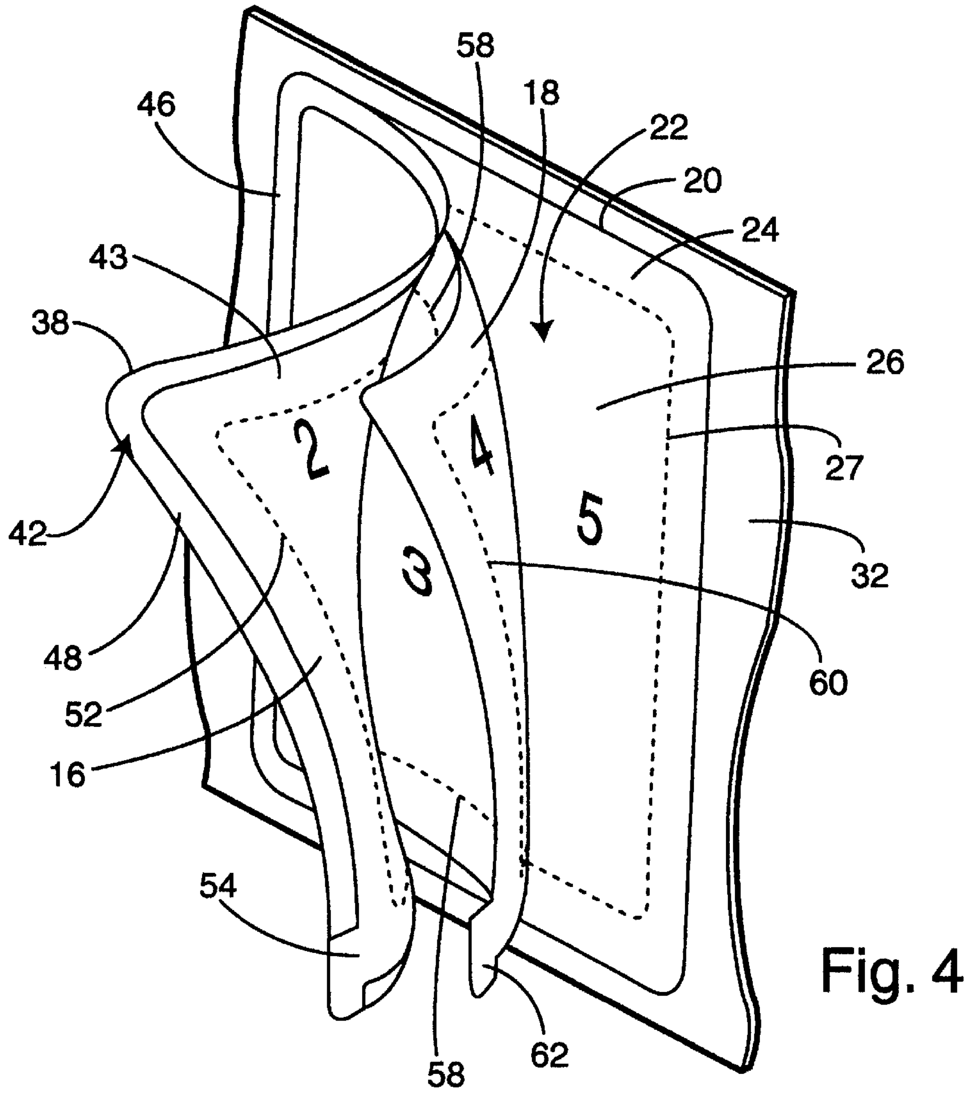
FIG. 4 is a perspective view of the label of the present invention in the unsealed and open position.
Figure 5:
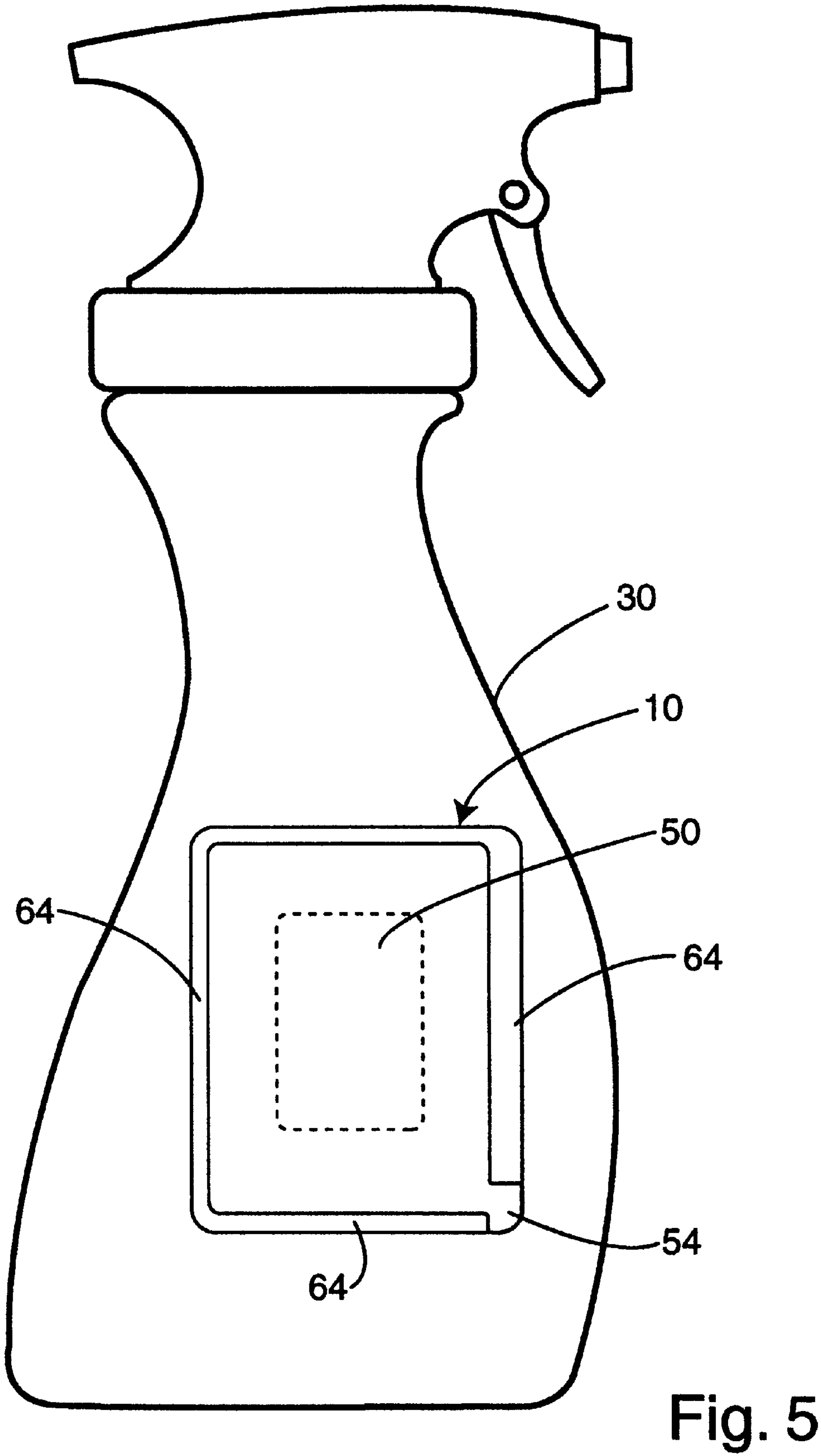
FIG. 5 is an elevational view of a container having the label of the present invention applied to it.

Preferably the label 10 includes tab means for lifting of top sheet 14 from base sheet 12. (FIG. 4.) First or second tab portions 54 or 62 may either singly on in concert provide the tab means. First tab portion 54 extends from the first sheet 16 into the second zone 48 of peripheral margin 42 so that the adhesive layer 44 applied to the rear of the top sheet 16 does not contact or releasably adhere to the base sheet 12 where tab 54 is located. Similarly, second tab portion 62 extends from the second sheet 18 into the second zone 48 of peripheral margin 42 so that the adhesive layer 44 applied to the rear of the top sheet 16 does not contact or releasably adhere to the base sheet 12 where the second tab 62 is located.

Label 10 also includes adhesive means 28 on the rear side of base sheet 12 for attaching base sheet 12 to an object—such as a container 30 or release liner 32. Adhesive means 28 may be a pressure-sensitive adhesive layer or another adhesive system as is known in the art. The release liner 32 includes a liner 34 with release coating layer 36. Release liner compositions and systems are known in the art. For example, in the preferred embodiment, liner 34 is paper and release coating layer 36 is a silicon release composition.

The release liner 32, base sheet 12, top sheet 14, and first and second informational sheets 16 and 18 are laminated using conventional production techniques, as it known in the art.

Use of the Multiple-Layer Label

Label 10 may be removed from release liner 32 and applied to a product or container 30 by conventional techniques, as is known in the art. As shown in FIGS. 1–3 and 5, label 10 is in the "closed" position having the top sheet adhesive layer 44 in the rear peripheral margin 42 of the top sheet 14 substantially sealing the top sheet to the front peripheral margin 24 of the base sheet to form a releasably sealed label margin 64 extending substantially around the periphery of label 10. Accordingly, the first and second informational sheets 16 and 18 are substantially enclosed between the top and base sheets when label 10 is in the closed position. The term "substantially" is used above with "sealed," "enclosed," and "around" to mean that a relatively small portion of the peripheral margin 64 in the area of the first and/or second tab portions may not be sealed in order to facilitate opening the label.

To open label 10, a user lifts first tab portion 54 to lift top sheet 14 from the base sheet 12 and unseal the second zone 48 of the rear peripheral margin 42 of the top sheet from the front peripheral margin 24 of the base sheet. (FIG. 4.) In doing so, the top sheet 14 turns like the page of a book, hinged to the base sheet by the adhesive in first zone 46. First informational sheet 16 is lifted with the top sheet since it is adhered to the top sheet within the rear interior area 43 of the top sheet. Thus, after opening or turning the top sheet, the printed information 52 on the rear of first informational sheet 16 and the printed information 58 on the front of second informational sheet 18 are visible for the user to read. (FIG. 4.) To read additional information, the user lifts second tab portion 62 to turn the second informational sheet 18, which is hinged to the base sheet by adhesive 56. After turning the second information sheet, printed information 60 on the rear of the second sheet and printed information 27 on the front of base sheet 12 are visible for reading by the user. After the user has read the information, the top sheet 14 may be resealed to the base sheet 12 to restore the label to its originally closed position. (FIGS. 1–3 and 5.) During the opening and closing operations, label 10 remains adhered to the product or container 30 by adhesive means 28. Once closed, top sheet 14 forms sealed label margin 64, to help protect the first and second sheets from environmental damages.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims, or where otherwise expressly indicated, all numerical quantities in this description indicating amounts of material, use conditions, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated.

What is claimed is:

1. A multiple-layer label comprising:

a base sheet having front and rear sides, a perimeter edge, a front interior area on the front side, and a front peripheral margin on the front side extending around the front interior area and proximate the perimeter edge of the base sheet, the front peripheral margin having a front first zone and a front second zone, the front second zone including substantially all of the front peripheral margin not within the front first zone;

a top sheet having front and rear sides, a perimeter edge, a rear interior area on the rear side of the top sheet, and a rear peripheral margin on the rear side of the top sheet extending around the rear interior area, the rear peripheral margin of the top sheet having a rear first zone and a rear second zone, the rear second zone of the top sheet including substantially all of the rear peripheral margin of the top sheet not within the rear first zone of the top sheet;

the top sheet being permanently adhesively hinged to the base sheet by permanently adhering the rear first zone of the rear peripheral margin of the top sheet to the front first zone of the front peripheral margin of the base sheet;

the top sheet being resealably adhered to the base sheet by resealably adhering the rear second zone of the rear peripheral margin of the top sheet to the front second zone of the front peripheral margin of the base sheet;

a first sheet substantially entirely adhered to the rear interior area of the top sheet, the first sheet being substantially contained within the rear interior area of the top sheet; and a second sheet adhesively hinged to the front interior area of the base sheet, the second sheet being substantially contained within the front interior area of the base sheet;

whereby the base sheet and the top sheet form a resealable structure enveloping the first and second sheets.

2. The label of claim 1 further comprising tab means near the perimeter edge of the top sheet for separating the second rear zone of the rear peripheral margin of the top sheet from the front second zone of the front peripheral margin of the base sheet.

3. The label of claim 1 further comprising adhesive means on the rear side of the base sheet for adhering the base sheet to an object.

4. The label of claim 1 wherein the top sheet is transparent.

5. The label of claim 1 wherein the base sheet, first sheet, second sheet, and top sheet are water-resistant.

6. A multiple-layer label comprising:

a base sheet having front and rear sides, a perimeter edge, a front interior area on the front side, and a front peripheral margin extending around the front interior area on the front side and proximate the perimeter edge of the base sheet;

a top sheet having front and rear sides, a perimeter edge, a rear interior area on the rear side of the top sheet, and a rear peripheral margin extending around the rear interior area on the rear side of the top sheet;

the top sheet being adhesively hinged to the base sheet by adhering a first zone of the rear peripheral margin of the top sheet to a first portion of the front peripheral margin of the base sheet;

the top sheet being resealably adhered to the base sheet by adhering a second zone of the rear peripheral margin of the top sheet to a second portion of the front peripheral margin of the base sheet;

a first sheet adhered to the rear interior area of the top sheet;

a second sheet adhesively hinged to a portion of the front interior area of the base sheet; and said top sheet including tab means proximate the perimeter edge of the top sheet for lifting the top sheet from the base sheet, the tab means includes a tab extending from the first sheet into the second zone of the rear peripheral margin of the top sheet.

7. A label to be affixed to an object, the label comprising:

a base sheet to be affixed to the object, the base sheet including an interior area and a base sheet peripheral margin surrounding said interior area, the base sheet peripheral margin having a base sheet hinge margin portion and a base sheet resealable margin portion that together comprise substantially all of the base sheet peripheral margin;

a top sheet including a top sheet interior area and a top sheet peripheral margin surrounding said interior area of the top sheet, the top sheet peripheral margin having a top sheet hinge margin portion permanently attached to substantially all of the base sheet hinge margin portion, the top sheet peripheral margin further having a top sheet resealable margin portion resealably attached to substantially all of the base sheet resealable margin portion; and first and second information sheets between said base sheet and said top sheet, the first information sheet attached to the top sheet and substantially contained within the top sheet interior area, the second information sheet attached to the base sheet and substantially contained within the base sheet interior area;

whereby the top sheet can be partially unsealed from the base sheet to allow access to the first and second information sheets and then resealed to envelop the first and second information sheets.

8. The label of claim 7 further comprising tab means proximate the top sheet peripheral margin for lifting the top sheet resealable margin portion from the base sheet resealable margin portion.

9. The labeled object of claim 7 further comprising adhesive means on the rear side of the base sheet for adhering the base sheet to an object.

10. The labeled object of claim 7 wherein the top sheet is transparent.

11. The label of claim 7 wherein the base sheet, first information sheet, second information sheet, and top sheet are water-resistant.

12. An improved labeled object including a multiple-layer label affixed to an object, wherein the improvement comprises the label comprising:

a base sheet affixed to the object, the base sheet including a base sheet peripheral margin, said base sheet peripheral margin having a base sheet hinge margin portion and a base sheet resealable margin portion that together comprises substantially all of said base sheet peripheral margin;

a top sheet including a top sheet peripheral margin, said top sheet peripheral margin having a top sheet hinge margin portion permanently attached to substantially all of said base sheet hinge margin portion, said top sheet peripheral margin further having a top sheet resealable margin portion resealably attached to substantially all of said base sheet resealable margin portion;

first and second information sheets between said base sheet and said top sheet, said first information sheet attached to said top sheet, said second sheet attached to said base sheet, whereby said top sheet can be unsealed for access to said first and second information sheets and then resealed to protect said first and second information sheets; and tab means proximate the top sheet peripheral margin for lifting the top sheet from the base sheet, the tab means includeing a tab extending from the first informational sheet into the top sheet resealable peripheral margin portion.

* * * * *